United States Patent [19]
Stromin et al.

[11] 3,780,362
[45] Dec. 18, 1973

[54] METHOD FOR CONTROL OF A BRUSHLESS MOTOR

[76] Inventors: Boris Alexandrovich Stromin, ulitsa Sportivnaya, 25, kv. 52; Boris Konstantinovich Baranov, spusk Gertsena, 11, kv. 26, both of Novocherkassk, U.S.S.R.

[22] Filed: Feb. 15, 1972

[21] Appl. No.: 226,455

[52] U.S. Cl. .............................................. 318/254
[51] Int. Cl. ......................................... H02k 29/00
[58] Field of Search ............................ 318/254, 138

[56] References Cited
UNITED STATES PATENTS

| | | | |
|---|---|---|---|
| 3,440,506 | 4/1969 | Krestel | 318/254 |
| 3,541,407 | 11/1970 | Lahoe | 318/254 |
| 3,529,220 | 9/1970 | Kobayashi | 318/254 |
| 3,611,081 | 10/1971 | Watson | 318/254 |
| 3,629,675 | 12/1971 | Porath | 318/254 |

*Primary Examiner*—Bernard A. Gilheany
*Assistant Examiner*—Thomas Langer
*Attorney*—Eric H. Waters et al.

[57] ABSTRACT

A method for control of a rectifier motor, which is a combination of a rotating machine and a frequency (and phase) changer, and a device for its realisation, consisting in that the control signals applied to the rectifying element of the frequency changer in phase with the processes taking place in the synchronous machine are derived by sampling the magnetic field of the stator core of the synchronous machine, for which purpose on the back of the stator core there are arranged magneto-sensitive elements connected to a signal comparison unit, so that a rectifier motor can be reliably controlled at low values of rotational e.m.f.s, at zero values of the rotational e.m.f.s in particular.

17 Claims, 4 Drawing Figures

METHOD FOR CONTROL OF A BRUSHLESS MOTOR

The present invention relates to a method for control of an SCR-commutated D.C. motor which is a combination of a rotating machine, a rectifier-type frequency and phase changer and a control device.

Known in the art are methods for the control of an SCR-commutated motor whereby signals are applied to the control electrodes of the rectifying elements in the inverter section of a frequency and phase changer either in phase with the position of the datum axis of the machine inductor rotor relative to the stator winding coils or in phase with the e.m.f.s. in the same coils.

In the former case, the known methods do not take into account the effect of stator reaction, owing to which the mean torque of the motor does not vary in proportion with the stator current. This results in a marked under-utilisation of the active materials of the motor at loads other than rated and in increased pulsations of the torque which adversely affect the driven machinery. In the latter case, the control of the SCR-commutated motor is altogether impossible when the motor is started from rest or is running at a low speed since the motor e.m.f. is zero or has a low value. Furthermore, control based on the inductor rotor position requires the provision of a considerable space for the accommodation of a measuring device, which fact reduces the power rating of the motor for the same overall dimensions.

An object of the present invention is to obviate the above disadvantages by providing a method for the control of an SCR-commutated D.C. motor and a device for its realization which insure reliable control of the motor at low values of the rotational e.m.f., notably, when this e.m.f. is zero.

With this object in view, the signals in phase with the processes taking place in the rotating machine are derived and applied, upon conversion, to the rectifying elements of the frequency and phase changer by introducing as a minimum the operation of sampling the magnetic field of the stator core (rotor) at the points whose coordinates are fixed relative to the phase windings of the armature.

With the same object in view, an additional operation is introduced to set the magneto-sensitive elements on the outer portion of the stator core symmetrically with respect to the phase windings.

Still with the same object in view, an additional operation is introduced to apply the pulses to the magneto-sensitive elements.

Also with the same object in view, an additional operation is introduced to compare the signals furnished by the magneto-sensitive elements.

Again with the same object in view, provisions are introduced to convert the continuous signal furnished by the comparison unit to a discrete form.

Yet with the same object in view, provisions are introduced for the logical conversion of the discrete signals in order to obtain signals with a duration of 120 el.-degrees.

Still with the same object in view, provisions are introduced to convert the signals obtained as above in accordance with the polarity of an A.C. source supplying the frequency and phase changer.

Still with the same object in view, an additional operation is introduced to differentiate the signals.

Finally, with the same object in view, an additional operation is introduced to amplify the signals and apply them to the controlled rectifiers of the frequency and phase changer.

In the device proposed herein for the realization of the above-mentioned method, the magneto-sensitive elements are preferably mounted on the stator core of the motors at the points whose coordinates are symmetrical with respect to the phase windings, and the output signals furnished by the magneto-sensitive elements are upon conversion applied to the rectifying elements of the frequency and phase changer.

Preferably the magneto-sensitive elements of said device are manufactured from a magnetizable material.

The magneto-sensitive elements are preferably mounted at the back of the stator core symmetrically with respect to the axes of the stator phase winding.

It is likewise preferable that a unit for comparison of the signals furnished by the magneto sensitive transducers be included in the device.

The magneto-sensitive transducers are preferably made in the form of windings arranged in groups of three so that one of the windings is connected to a pulse generator, embraces two small sections of the stator core and magnetizes them in the opposite directions, while the other two windings embrace one of said stator core sections each and are connected to the comparison unit.

The outputs of the comparison units are preferably connected to the inputs of flip-flops to convert the continuous signals to a discrete form.

Preferably the outputs of said flip-flops are connected to the inputs of the "and-not" gates, whose parallel inputs connect to the output of a flip-flop, the input of said flip-flop being connected through an amplitude gate to a source of a fixed (commercial) frequency voltage.

The outputs of the "and-not" gates are preferably connected through capacitors to the inputs of pulse amplifiers.

The outputs of the pulse amplifiers are preferably connected to the control electrodes of the rectifying elements in the frequency and phase changer.

The invention will be best understood from the following description of a preferred embodiment than read in connection with the accompanying drawings, in which.

In accordance with the invention, a method for the control of an SCR-commutated D.C. motor which is a combination of a motor with a frequency and phase changer consists in that the control signals applied to the rectifying elements of the changer are derived not from the position of an indicator rotor 1 (FIG. 1) but by sampling the magnetic field of an armature (stator) 2 of the motor at points symmetrical with respect to the phase winding.

Figure 2:
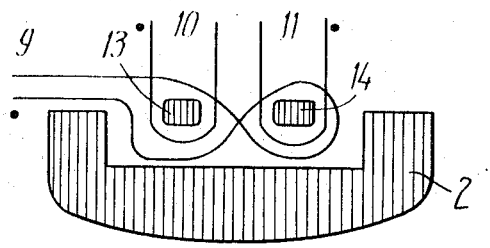
FIG. 2 is a side sectional view of magneto-sensitive elements.

For this purpose, magneto-sensitive elements (transducers) 3, 4 and 5 whose side (sectional) view is shown in FIG. 2 are arranged on the back of the core of a motor stator 2, the outputs of said elements being connected to control signal comparison units 6, 7 and 8.

The location of the magneto-sensitive elements 3, 4 and 5 depends on the position of coils AA¹, BB¹ and CC¹ of the stator winding of the rotating machine and the adopted sequence of control-signal comparison in the comparison units 6, 7 and 8.

Figure 1:
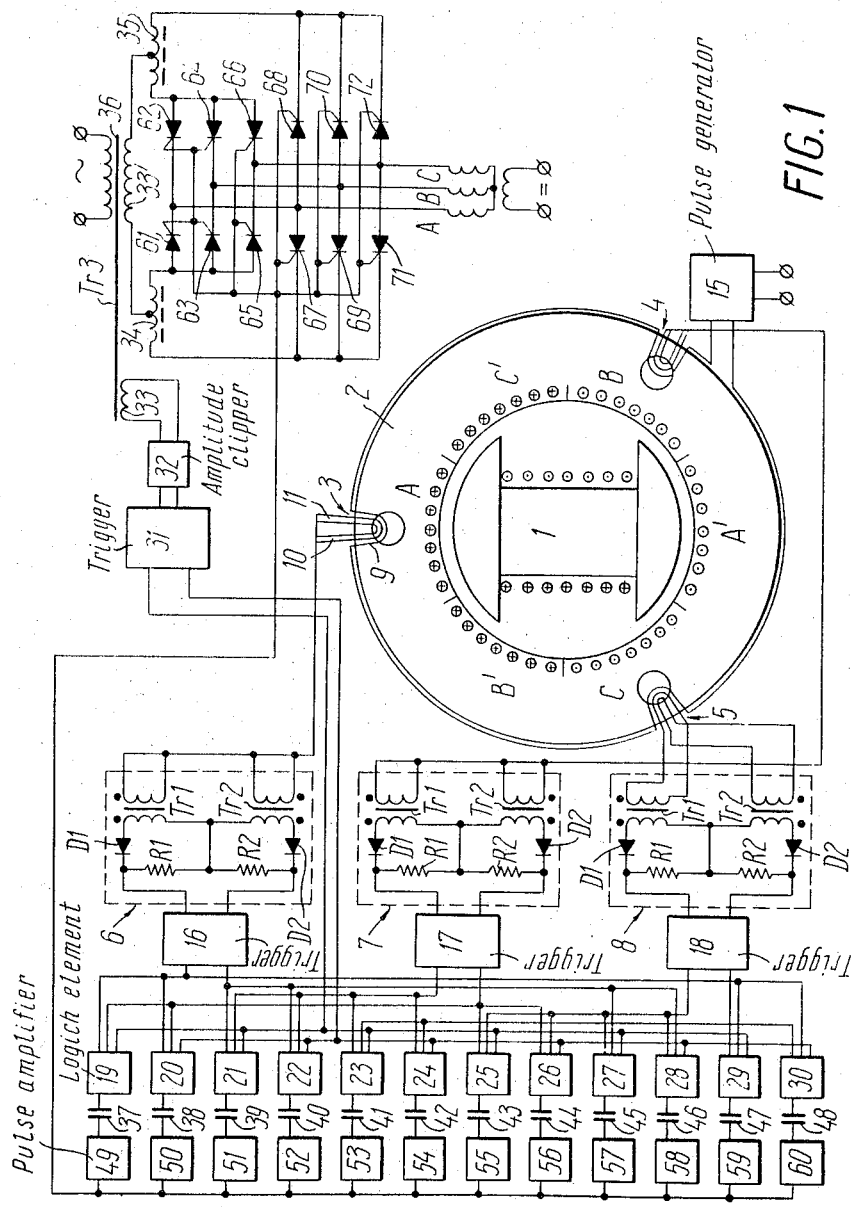
FIG. 1 shows the arrangement and connection of magneto-sensitive elements on the motor stator core and a schematic diagram of the control device.

As seen from reference to FIG. 1 and FIG. 2 in the embodiment described herein, each of the magneto-sensitive elements 3, 4 and 5 is made up of three windings 9, 10 and 11, so that one of the windings (winding 9) embraces two small sections 13 and 14 of the core of the stator 2, is connected to a pulse generator 15 and effects cyclic magnetization of the core sections 13 and 14. Two other windings 10 and 11 embrace one of the core sections 13 and 14, respectively, and are connected to said comparison units 6, 7 and 8. Windings 10 and 11 detect imbalances in magnetic fields as between their respective core sections. Each of the comparison units 6, 7 and 8 is made up of two step-up transformers Tr1 and Tr2, the primary windings of which are connected to the outputs of the magneto-sensitive elements 4, 5 and 6 while the secondary windings are connected through diodes D1 and D2 to load resistors R1 and R2 connected in series so as to provide the comparison of the signals obtained from the respective magneto-sensitive elements.

The outputs of the comparison units 6, 7 and 8 are connected to the inputs of flip-flops 16, 17 and 18 which convert continuous signals to a discrete form.

The outputs of the flip-flops 16, 17 and 18 are connected to the inputs of "and-not" gates 19-30 as shown in FIG. 1.

Connected to the parallel inputs of the gates 19-30 is a flip-flop 31 whose input is coupled through an amplitude gate 32 to a secondary winding 33 of a transformer Tr3, the secondary winding 33' of which is connected through windings 34 and 35 of a smoothing choke of a frequency and phase converter, a primary winding 36 of said transformer being connected to a source of a fixed (commercial) frequency voltage.

The outputs of the gates 19-30 are connected through differentiating networks (capacitors) 37-48 to the inputs of pulse amplifiers 49-60, the outputs thereof being connected to the control electrodes of rectifying elements (silicon-controlled rectifiers) 61-72 of the frequency and phase changer.

Figure 3:
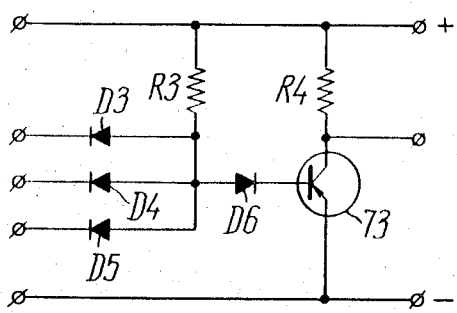
FIG. 3 is a diagram of an "and-not" gate with three inputs.

The circuit configuration of "and-not" gates 19-30 is well-known and is illustrated in FIG. 3 which shows isolating input diodes D3, D4 and D5, a resistor R3 and a diode D6 through which the base current of a transistor 73 flows, with a load resistor 4 connected in series with the transistor collector. The point where the collector of the transistor 73 is connected to the resistor 4 is the output of the "and-not" gate.

Figure 4:
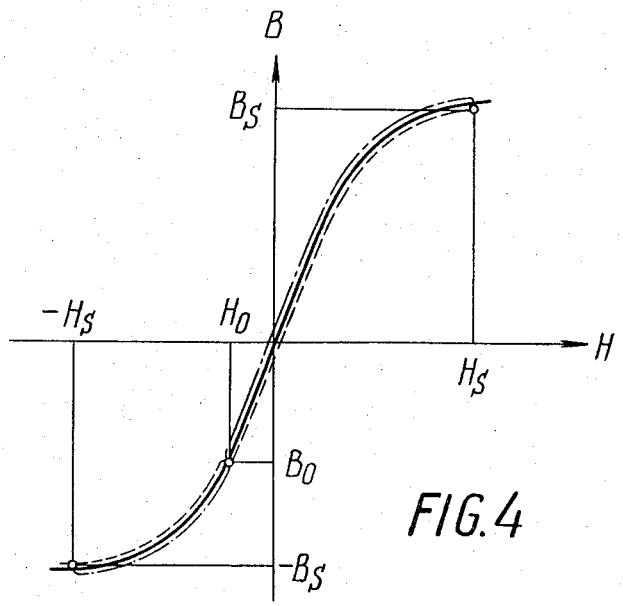
FIG. 4 is a cyclic magnetization curve of one section of the stator core.

Upon arrival of a voltage pulse from the generator 15 the sections 13 and 14 of the core embraced by the winding 9 of the magneto-sensitive element 3 (4 or 5) are respectively driven from the initial state at which the magnetic induction is $B_o$ (FIG. 4) and the magnetic field intensity is $H_o$ to saturation at which the induction is $B_s, -B_s$ and the field intensity is $H_s, -H_s$ (shown by the dashed line in FIG. 4). When the signal ceases the resultant m.m.f. of the motor drives the same core sections 13 and 14 to a state close to the initial one (shown by the dash-dot line in FIG. 4). The cyclic magnetisation induces e.m.f.s. in the coils 10 and 11 of the magneto-sensitive element 3 (4 or 5). These e.m.f.s. are applied to the comparison unit 6 (7 or 8) and then converted to a rectangular shape by the flip-flop 16 (17 or 18) whose outputs are connected to the inputs of the "and-not" gates 19-30 to obtain signals with a duration of a 120 el.degrees. As the rectifying elements of the changer perform not only inversion but also rectification the outputs of the flip-flop 31 are connected to the parallel inputs of the "and-not" gates 19-30 while the inputs of said flip-flop are connected, as was mentioned, above to the source of a fixed (commercial) frequency voltage through the amplitude gate 32. Upon differentiation, the leading edge of the voltage pulse furnished by the "and-not" gates 19-30 is amplified by the amplifiers 49-60 and applied to the control electrodes of the rectifying elements 61-72 in the frequency and phase changer.

To enable a better understanding of the idea of the present invention, further reference is made to FIG. 1 which shows the following:

1. Trigger means 16-18 to convert the voltage pulses arriving from the signal comparison units 6-8 to rectangular voltage.

2. Logical means 19-30, whose input is supplied with voltage from the trigger means 16-18 and with the voltage from supply 30. The logical means 19-30 is intended to convert these signals into pulses for controlling rectifiers 63-72 of the frequency and phase changer whose opening results in current flow in the phase windings AA', BB' and CC' of the motor in the direction producing maximum torque in the required direction.

3. Output amplifiers 4-60 to amplify the pulses arriving from the logical means 19-30. Each of the output amplifiers is connected to one of the 12 rectifiers of the frequency and phase changer. If necessary, each of the rectifiers may be replaced by a group of rectifiers interconnected in series and in parallel. In this case, the output amplifier would control a group of controllable rectifiers (thyristors).

4. The frequency and phase changer comprising a power transformer 33, a choke 34 and 35 which closes a D.C. circuit, and the controllable rectifiers 63-72 interconnected as shown. Thus, if the input of the frequency and phase changer is a single-phase current of fixed (industrial) frequency, the output of the changer will produce a three-phase current at controlled frequency. This corresponds to the conversion of direct current applied to a machine collector into alternating current flowing in the winding of its armature.

The operating principle of the rectifier motor, therefore, consists in that, depending on the position of the rotor relative to the stator phase windings, current is allowed to flow in the phase windings and in the direction which leads to the maximum torque of the desired direction. The current essentially flows in two phase windings, and it flows in all the three windings only at the moment when the current is switched from one phase winding to another.

The above shows that the rectifier motor features a rigid feedback between the rotor rotation and the current switching in the phase windings.

It is known that the torque of a rectifier motor depends on the value of current flowing through the phase windings and on the magnetic induction in this area.

The control of the rectifier motor with respect to the position of the rotor relative to the stator phase windings, does not take into account the distortion of the induction curve in the air gap of the machine under the influence of current flowing in& the phase windings.

The above described control method is free of this drawback since it provides for utilizing the magnetic field in the stator of the rectifier motor as the basic information.

What is claimed is:

1. A method for control of an SCR-commutated D.C. motor which is a combination of a rotating motor with a stator core and stator phase windings, and a frequency and phase changer supplying said stator windings, said method comprising the operation of sampling the magnetic field of said stator core of said rotating motor at points whose coordinates are fixed with respect to said armature windings for deriving signals which are in phase with magnetic field changes taking place in said stator core and applying said signals to said frequency and phase changer.

2. A method as of claim 1 which comprises an additional operation of setting the magneto-sensitive transducers on the outer portion of said armature core symmetrically with respect to the phase winding axes.

3. A method as of claim 2 which comprises an additional operation of applying pulses to magneto-sensitive elements.

4. A method as of claim 3 which comprises an additional operation of comparing the signals derived from the respective magneto-sensitive elements.

5. A method as of claim 4 which comprises an additional operation of converting the signal derived from the comparison elements to a discrete form.

6. A method as of claim 5 which comprises logical conversion of discrete signals to signals with a duration of 120 electric degrees.

7. A method as of claim 6 which comprises conversion of the obtained signals in accordance with the polarity of the A.C. source supplying the frequency and phase changer.

8. A method as of claim 7 which comprises differentiation of the obtained signals.

9. A method as of claim 8 which comprises amplification of the obtained pulses and their application to the controlled rectifiers of the frequency and phase changer.

10. A device for control of an SCR-commutated D.C. motor comprising a rotating motor including a rotor, a stator core and stator phase windings, a frequency and phase changer means consisting of controlled rectifiers connected to said winding; said device further including magneto-sensitive means mounted on the stator core of the rotating motor at points whose coordinates are fixed with respect to the stator windings and responsive to rotor position to furnish signals which are applied to said rectifiers of the frequency and phase changer, said magneto-sensitive means being of a magnetizable material.

11. A device as of claim 10 wherein said magneto-sensitive means are arranged at the back of said stator core symmetrically with respect to the axes of its phase windings.

12. A device as of claim 11 which comprises an element for comparison of the signals derived from the magneto-sensitive means.

13. A device as of claim 12 wherein said magneto-sensitive means are made up of windings arranged in groups of three; one of said windings is connected to a pulse generator and embraces two small sections of the stator core magnetizing them in the forward and reverse directions, while the other two windings embrace one of said core sections each and are connected to said comparison element.

14. A device as of claim 13 comprising flip-flops and wherein the comparison elements are connected to the inputs of the flip-flops which convert the continuous signal to a discrete form.

15. A device as of claim 14, comprising "and-not" gates and wherein the outputs of said flip-flops are connected to the inputs of the "and-not" gates whose parallel inputs connect to the output of a flip-flop, the input of said flip-flop being connected through an amplitude gain to a source of fixed frequency voltage.

16. A device as of claim 16 wherein the outputs of the gates are connected through capacitors to the inputs of pulse amplifiers.

17. A device as of claim 16 wherein the outputs of the pulse amplifiers are connected to the control electrodes of the rectifiers in the frequency and phase changer.

* * * * *